May 21, 1940.　　　M. S. WILLING　　　2,201,279
MEANS FOR PREVENTING SOIL EROSION
Filed Feb. 4, 1938
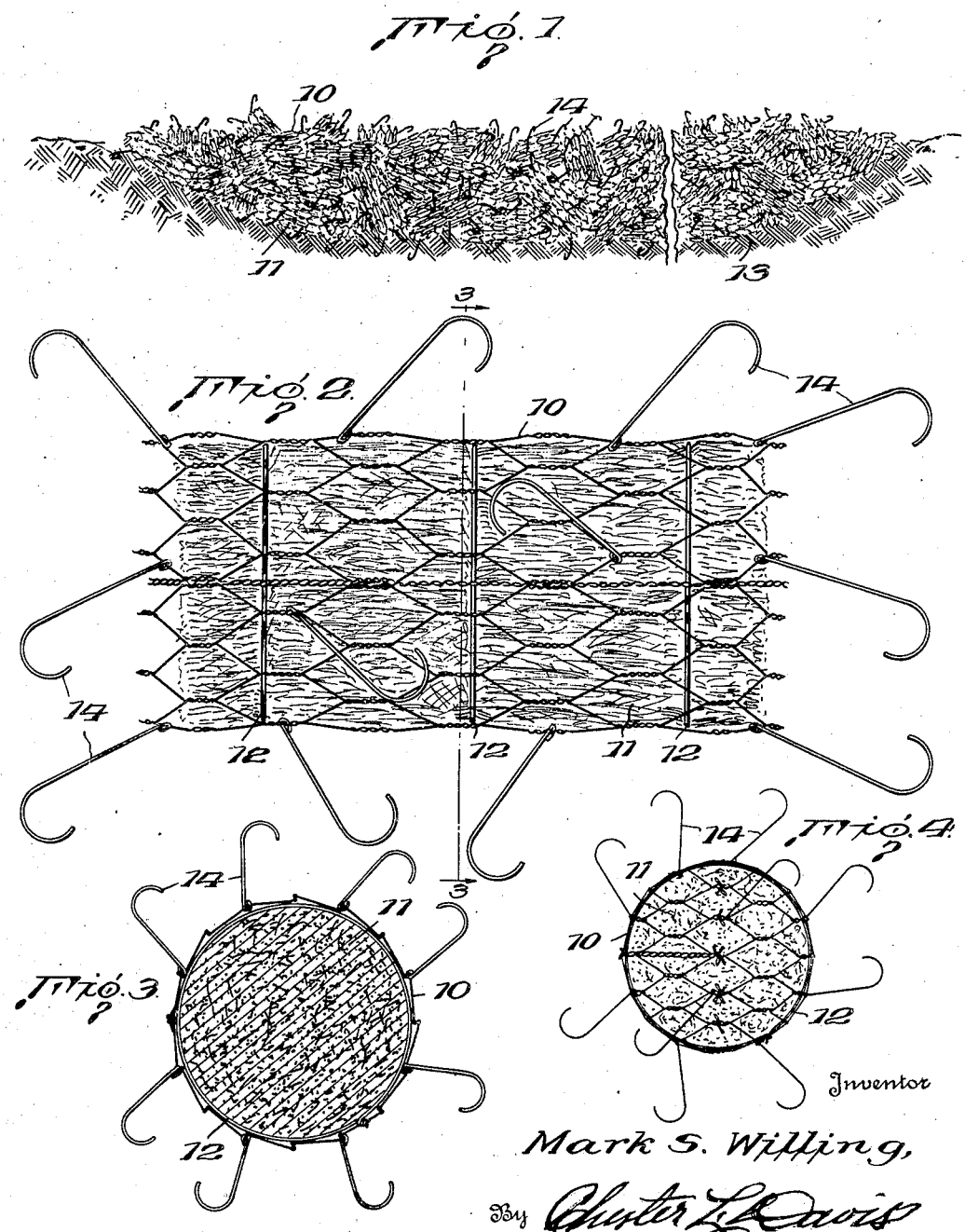

Patented May 21, 1940

2,201,279

UNITED STATES PATENT OFFICE 2,201,279

MEANS FOR PREVENTING SOIL EROSION

Mark S. Willing, Mount Holly, Va., assignor of two and one-half per cent to Chester L. Davis, Washington, D. C., and thirty-three and one-third per cent to Harold J. Neale, Richmond, Va.

Application February 4, 1938, Serial No. 188,791

1 Claim. (Cl. 61—35)

This invention relates to improvements in means for the prevention of soil erosion by flowing water.

One object of the invention is to provide a device of simple and inexpensive construction which will be highly efficient in preventing soil erosion by flowing water.

A further object is to provide a device of this nature which lends itself readily to being assembled in any desired numbers, the several individual devices being interlocked, one with the other, to form an entangled mass of desired size to stem the flow of water over any given area, thus preventing or curtailing the scouring or eroding action of the water.

A still further object is to provide a frameless container of flexible material which will readily adapt itself to the contour of the surface on which it is placed.

More specifically, the invention contemplates means for preventing soil erosion by flowing water, said means consisting of a flexible container of wire mesh material, preferably filled with means for augmenting the accumulation of earthly matter therein and a plurality of hooks secured to said container and more or less promiscuously positioned around the same, whereby two or more of said containers placed in contact with one another will become entangled and form a substantially unitary mass. All of this is quite fully set forth in my former Patent 2,071,779 of February 23, 1937, entitled "Means for preventing soil erosion."

The outstanding improvement contained in the present application has to do with embodying in the earthy matter or other material placed in the matt, the presence of growing roots or sprouted seeds or those capable of readily sprouting, or of willow branches, or roots of any kind whether grass or honeysuckle or of other vines, or in fact any growing vegetation or material capable of growing so that roots will be established in the earthy matter contained in the original matt or accumulated in use.

With these and other objects in view, the invention consists in certain details of construction and combinations and arrangements of parts, all as will hereinafter be more fully described, and the novel features thereof particularly pointed out in the appended claim.

In the accompanying drawing—

Figure 1 illustrates a mass of the present containers located in a depression in the earth's surface, under which circumstances further erosion by water flowing along the depression will be prevented;

Fig. 2 is a side elevation of one of the individual containers;

Fig. 3 is a transverse sectional view on the line 3—3 of Fig. 2; and

Fig. 4 is an end elevation of the container.

In order that there can be some seepage or flow of water through an obstruction formed by a multiplicity of the containers of the present invention, said containers are made of a mesh-like material, a wire mesh material 10 being illustrated in the present instance. It is, of course, possible to have the container of other construction as will appear later. Enclosed within each container is a material which will facilitate or augment the accumulation of silt, mud, earthy matter or the like, and gradually fill all the interstices so as to form a substantially closed obstruction to the flow of water in the channel in which the mass of containers is assembled. One material that can be used, as illustrated in the present instance, is brush or heavy weeds 11, or the like, preferably secured more or less in bundle form by bands 12. In with this brush or weeds it is necessary or desirable to place the seeds or preferably live roots as mentioned above.

As illustrated in Fig. 1, a large number of the containers 10 are massed in a depression or channel in the earth's surface 13. In other words, this depression may be assumed to have been formed by an excessive flow of water over this area, and by damming up the depression with the containers, further erosion or scouring of the earth's surface at this point will be prevented.

If desired, additional weight may be given the individual containers by some suitable means such as enclosing rather large stones or rocks (not shown) within the brush material, but such anchoring means are not essential as the present container is provided with a number of hooks 14 distributed promiscuously around the container. Each hook is formed with an eye at one end, loosely encircling one or more of the wire strands constituting the mesh material, so that the hooks may be said to be pivotally secured to the container. In depositing or throwing the containers in, or on, the area to be protected, a number of them may be securerd together by hooking one into the other, prior to placing them on the earth, or they can be thrown in individually and, due to the irregular disposition of the hooks and the swiveling action of which they are capable, the bundles, as they are successively placed in contact with one another, will immediately become entangled and thus build up a mass such as illustrated in Fig. 1. Furthermore, the hooks, in addition to facilitating entangling the containers one with the other, also serve as anchoring means, because they will readily attach themselves to irregularities on the surface on which the containers are placed.

It will also be observed that no frame is used in the present container. Therefore, due to the flexibility of the mesh material of which the container is formed, the containers will readily adapt themselves to major irregularities in the surface of the earth on which they are placed. The construction of the individual containers is such that they may be produced at very little expense and, by the provision of the several hooks on each container, they may be readily and easily secured together to build up a mass of the desired size and bulk to protect any given area of earth's surface subjected to the eroding action of flowing water. As has been previously stated, the loosely secured hooks permit the containers to be secured together manually, preliminary to being deposited on the surface to be protected, or they will quickly become entangled, one with the other, if deposited successively and individually. In other words, no special effort is necessary to secure the individual containers together in building up a mass of desired size. Also, the flexibility of the container, which permits the containers to adapt themselves to major irregularities in the contour of the surface to be protected, insures the absence of any openings of appreciable size through which the water may continue to flow and subject the surface to further eroding action.

The nature of the filler or material in the container is such as to augment the distortion of the filled container to correspond to the irregularities in the contour of the earth. It is also such as to present comparatively small interstices so as to permit a slight seepage while still effectively damming the flow of water so far as further erosion is concerned. However, this close conformation of the mass to the earth's surface is important as it prevents erosion around the container, the amount of seepage not being sufficient to undermine, so to speak, the containers once they are lodged at the point to be protected. Also, in the connection, the weight of the filler does not cause undue pressure to be placed on the lower containers when they are massed one upon another, a face which also tends to eliminate erosion taking place around the containers. The filler material is preferably of a weight which permits the individual containers being handled manually so they are readily transported and handled by the workmen. It will be understood, however, that the individual containers must be of sufficient weight to submerge and not be carried away on the current of the water.

The brush or other filler may be wrapped or tied together by wire and in so doing one need not use the mesh wire illustrated. If this construction is followed it might be desirable to employ long sticks or bamboo rods or the like laid lengthwise so as to assist forming the bundle. By this arrangement the live roots embedded in the matter used would not easily be washed away but would collect silt and earthy matter so as to form a matted mass as desired. Furthermore, there is no reason for adhering, in all instances, to the construction illustrated since obviously the roll could be flattened or otherwise fashioned like a mattress, or in any other shape desired depending upon the specific type of erosion one is confronted with.

As illustrated in Fig. 4, the ends of the individual containers may be closed by simply securing the ends of the wire mesh material together.

What I claim is:

Means for preventing soil erosion by flowing water, said means consisting of a flexible container of mesh material, distortable filler material combined with readily germinating seeds within said container for augmenting the accumulation of earthy matter therein and facilitating conformation of the mass to the contour of the earth to be protected, said filler material having an appreciably lighter weight than rocks.

MARK S. WILLING.